(12) United States Patent
Brännmark

(10) Patent No.: US 6,677,527 B2
(45) Date of Patent: Jan. 13, 2004

(54) CONNECTION MEMBER

(75) Inventor: Håkan Brännmark, Södertälje (SE)

(73) Assignee: Emerson Energy Systems AB (SE)

( * ) Notice: Subject to any disclaimer, the term of this patent is extended or adjusted under 35 U.S.C. 154(b) by 0 days.

(21) Appl. No.: 09/989,944

(22) Filed: Nov. 21, 2001

(65) Prior Publication Data

US 2002/0139557 A1 Oct. 3, 2002

(30) Foreign Application Priority Data

Nov. 22, 2000 (SE) .............................................. 0004276

(51) Int. Cl.$^7$ ................................................ H02G 5/00
(52) U.S. Cl. .................. 174/68.2; 174/70 B; 174/88 B; 174/149 B; 148/432; 439/507
(58) Field of Search ............... 174/68.2, 70 B, 174/71 B, 88 B, 99 B, 129 B, 149 B; 148/432, 679–687; 439/507

(56) References Cited

U.S. PATENT DOCUMENTS

| | | | |
|---|---|---|---|
| 3,566,008 A | | 2/1971 | Ettlnger et al. |
| 3,663,311 A | * | 5/1972 | Chin et al. .................. 148/434 |
| 3,774,431 A | * | 11/1973 | Stromblad et al. .......... 148/683 |
| 4,008,365 A | | 2/1977 | Carlson |
| 4,097,103 A | * | 6/1978 | Krause ...................... 174/88 B |
| 4,233,067 A | * | 11/1980 | Sawada ...................... 148/432 |
| 4,245,874 A | * | 1/1981 | Bishop ...................... 174/70 B |
| 4,361,724 A | * | 11/1982 | Olashaw ................... 174/129 B |
| 4,605,532 A | * | 8/1986 | Knorr et al. ............... 148/412 |
| 5,119,268 A | | 6/1992 | Brown et al. |
| 5,349,131 A | * | 9/1994 | Sotani et al. .................. 174/24 |
| 5,565,045 A | * | 10/1996 | Caron et al. ................ 148/432 |
| 5,667,752 A | * | 9/1997 | Suzuki et al. ............... 148/432 |
| 5,783,779 A | * | 7/1998 | Graham et al. ........... 174/88 B |
| 5,821,464 A | * | 10/1998 | Graham et al. ................ 174/86 |
| 6,205,017 B1 | * | 3/2001 | Wilkie et al. ............. 174/70 B |
| 6,241,831 B1 | * | 6/2001 | Bhargava .................... 148/432 |
| 6,320,130 B1 | * | 11/2001 | Takahashi .................... 174/251 |

OTHER PUBLICATIONS

ASM Handbook, Metals Handbook. Oct. 1990. vol. 2. pp. 216, 219, and 223.*

* cited by examiner

Primary Examiner—Dean A. Reichard
Assistant Examiner—Adolfo Nino
(74) Attorney, Agent, or Firm—Harness, Dickey & Pierce, P.L.C.

(57) ABSTRACT

Connection member made of metal for electrical connection between at least two electric power distribution modules, such as power plant equipment cabinets (2) or the like, which member (1) comprises at least a first and a second joining end portion (7, 8) having their relative positions to each other in a first relative status by means of an intermediate portion (12) positioned between the joining end portions (7, 8), which intermediate portion (12) is sufficient stiff to keep the portions (7, 8) in the first relative status.

Figure 1:
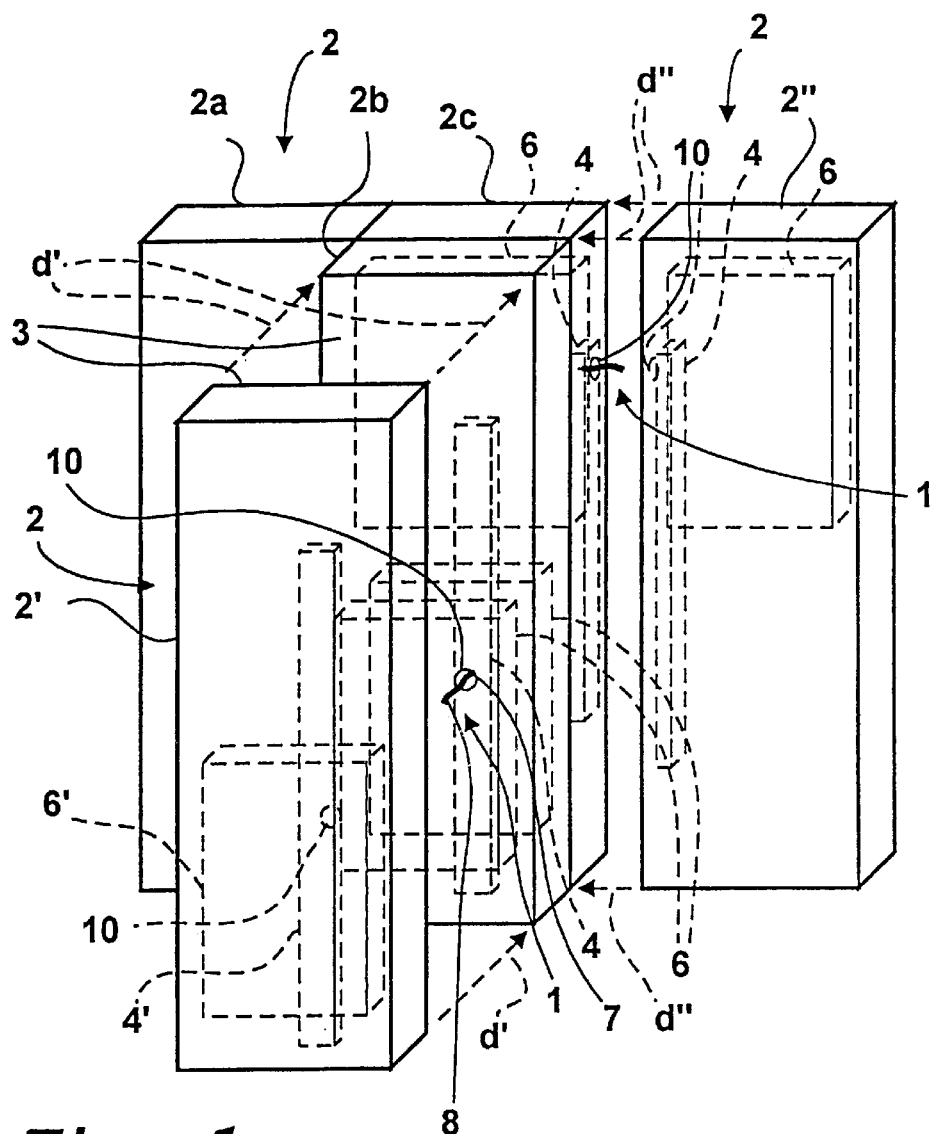

The intermediate portion (12) is made so flexible that the relative positions of the first and second joining end portions (7, 8) can be adjusted to a second relative status by means of plastic deformation of the intermediate portion (12).

10 Claims, 3 Drawing Sheets

CONNECTION MEMBER

CROSS-REFERENCE TO RELATED APPLICATIONS

This application claims the benefit of Swedish Patent Application No. 0004276-2, filed on Nov. 22, 2000.

TECHNICAL FIELD

The present invention relates to a connection member according to the introductory portion of claim 1.

BACKGROUND OF THE INVENTION

Electric power plant equipment comprises cabinets with devices for converting or transforming electrical power. The devices within the cabinet for converting electrical power can be so-called current rectifier devices.

In case of using large sets of cabinets or modules for converting electrical power, a plurality of cabinets or modules of standard model with similar outer measurement, are connected to each other for making a functional unit. Each cabinet comprises bus bars for internal distribution of electric current to the devices within the cabinets. The bus bars of each cabinet or module are connected to each other via a connection member for providing an electrical contact between the cabinets. The connection members are consequently mountable between the bus bars of the cabinets for making an electrical connection between the electric power devices in respective cabinet. The cabinets can be placed side by side alternatively with their rear sides oriented towards each other.

In some cases, the connection member has to be coarse for carrying a large electric current between the bus bars of respective cabinet. The electric current can be up to 1800 ampere or higher. Connection members can also be designed for electric current below 1800 ampere. A connection member according to prior art is formed as a short and stiff homogenous stick made of copper.

A connection member is made of a plurality of flexible cables, for example six copper cables of 150 $mm^2$ area each. These connection members are also stiff due to their short length. This means that the alignment and the positioning of the cabinets must be precise for making an easy mounting of the connection member between the bus bars of respective cabinet. It is complicated and difficult to achieve desired positioning of the cabinets, using a connection member according to known technique.

A connection member is made flexible. The connection member consists of a plurality of strips made of copper, each 1×50 mm in its cross section. Other connection members consist of strips with other dimensions, for example 1×25 mm. The strips are assembled together forming a package. Each strip slip on the adjacent strip when the package is bent. The construction is complicated and is made of several parts. The construction can only be bent in one specific direction.

Known connection members, used for electrical connection between electric power distribution modules, suffer from the disadvantages that they are complicated and expensive to produce and mount. Known flexible connection members are also difficult to mount since these connection members have a spring back action ability. They are also bulky.

SUMMARY OF THE INVENTION

These problems have been solved by a connection member as initially defined, which is characterized in that the intermediate portion is made so flexible that the relative positions of the first and second joining end portions can be adjusted to a second relative status by means of plastic deformation of the intermediate portion.

Hereby is achieved that the connection member according to the present invention will be mountable between two cabinets without any spring back action. A spring back action of the connection member would complicate the mounting of the connection member to the bars of the adjacent placed cabinets. The connection member according to the present invention means also that it is stiff in a first relative status, whereby it will be easy to assembly two cabinets to each other.

Further solutions regarding objects and features of the present invention are disclosed in the following claims.

Suitably, at least one of the joining end portions and the intermediate portion are made of the same material and in one piece. Hereby the connection member will be uncomplicated and less expensive to produce than prior art members.

Preferably, at least one of the joining end portions is made of a different material than the intermediate portion. Hereby the end portions can be arranged detachable and made of different material. This is advantageously when a set of intermediate portions of different length or thickness is used in a standard system. Assembly personnel can hereby replace a joining end portion designed with a first characteristic, to a joining end portion with different characteristic, without dismounting the entire connection member.

Suitably, the first and second joining end portions can be adjusted by hand to the second relative status. Hereby the assembly personnel can bend the connection member to join both bus bars of the cabinet without any support of tools. This will make the mounting uncomplicated.

Preferably, the intermediate portion comprises soft-annealed material for making the intermediate portion flexible. Hereby the manufacture of the connection member is less expensive than prior art and less complicated.

Suitably, at least one of the joining end portions comprises cold worked material. Hereby a joining section, made of a material with a higher degree of hardness tan the material of said intermediate portion, is achieved by means of an uncomplicated manufacture method. The achieved hardness of a part of the joining end portions being in contact with the bus bars, has the effect that the fastening will be solid. The hardness of the material of these parts is so high, that a nut drawn at a threaded pin or a fastening clamp pressing against the part will not fleet thereupon and therefore be sufficient tightened. By means of cold working, the connection member can be made in one piece in a economically advantageous manner.

Preferably, at least one of the joining end portions comprises junction means for fastening the connection member to a bus bar of the electric power distribution module. Hereby a fastening of the connection member can be achieved In a suitable way onto the bus bar of the cabinet. The junction can be achieved by means of screws, a bolt and nut assembly etc.

Suitably, the connection member essentially has a circular cross-section area for making the intermediate portion flexible in all directions divergent from a central line essentially defined by the longitudinal direction of the intermediate portion when the joining end portions are in the first relative status. Hereby the cabinets can be mounted to each other without the necessity to adjust them in a precise manner depending on the fitting of the connection member. Since the assembly personnel do not have to spend time wasting work on adjusting the cabinets to each other in an exact conjunction depending on a stiff or back spring acting connection member according to known technique, the procedure to connect the two cabinets to each other will take less time than what is normal according to known technique. The adjustment is though possible in all directions of a plane corresponding to the sides of the cabinets being placed toward each other. Since the connection member is flexible in all directions of said plane, the cabinets can be adjusted in any desirable positions relatively each other after that the connection member according to the invention is fastened. This also means that the bus bar of each cabinet do not need to have an exact normative distance to said side of each specific cabinet or an exact level over a floor on which the cabinets are standing.

Preferably, the connection member essentially has a rectangular cross-section area for making the intermediate portion essentially flexible in the directions congruent to a plane extending transverse the cross-section area and parallel to the shorter side of the rectangle defined by the rectangular cross-section. Hereby the assembly personnel do not have to make an effort to adjust the cabinets to each other in an exact conjunction during mounting. This will also reduce the mounting cost.

Suitably, said connection member has its prolongation formed as a Z and is made of copper. Hereby a folding effect is provided. When the both joining end portions of the connection member are pulled from or pushed towards each other, the Z-formed prolongation implies that the connection member will act like an expansion joint. This means that the mounting of the connection member to the respective bus bars of two cabinets will be less complicated and less expensive. Since the assembly personnel do not have to spend timewasting work to adjust the cabinets to each other in an exact conjunction, especially an adjustment in the longitudinal direction of the connection member, the procedure to connect the two cabinets to each other will take less time than what is normal according to known technique.

DRAWING SUMMARY

Figure 2D:
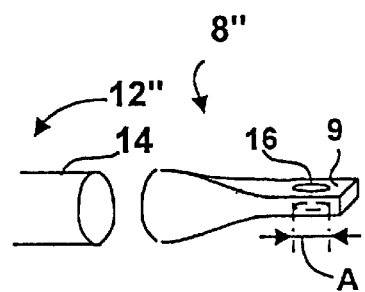
Figure 2A:
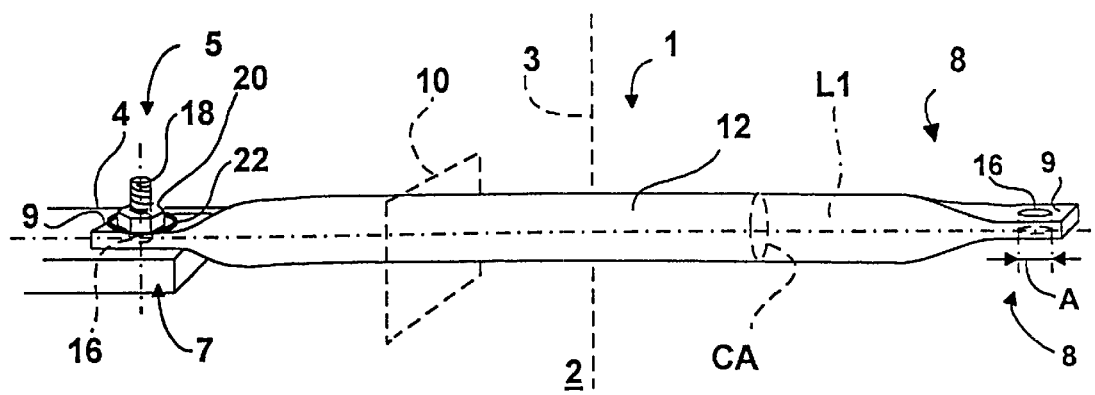
Figure 2B:
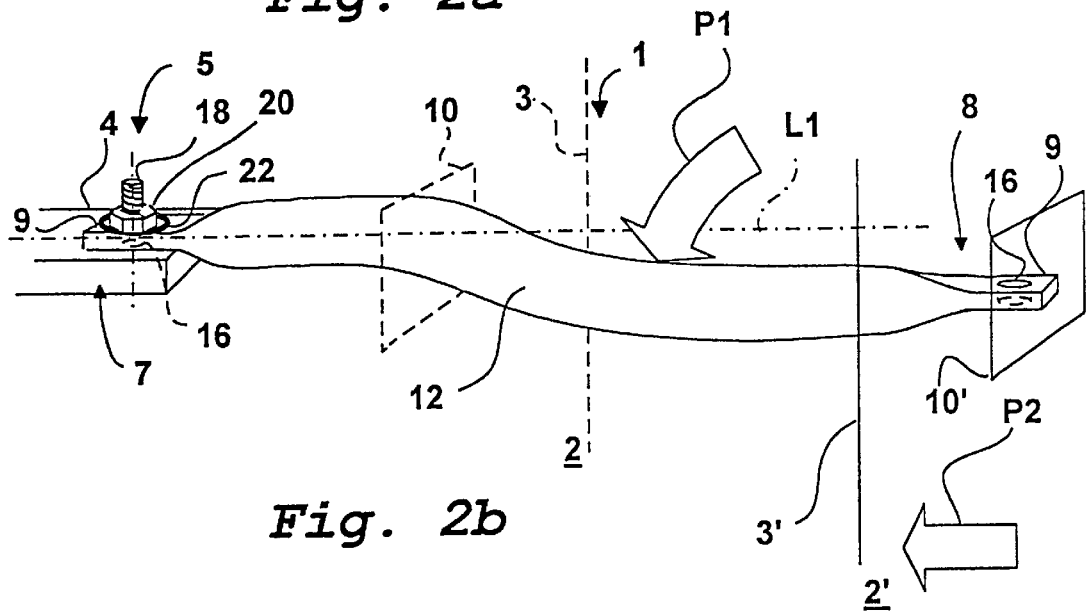
Figure 2C:
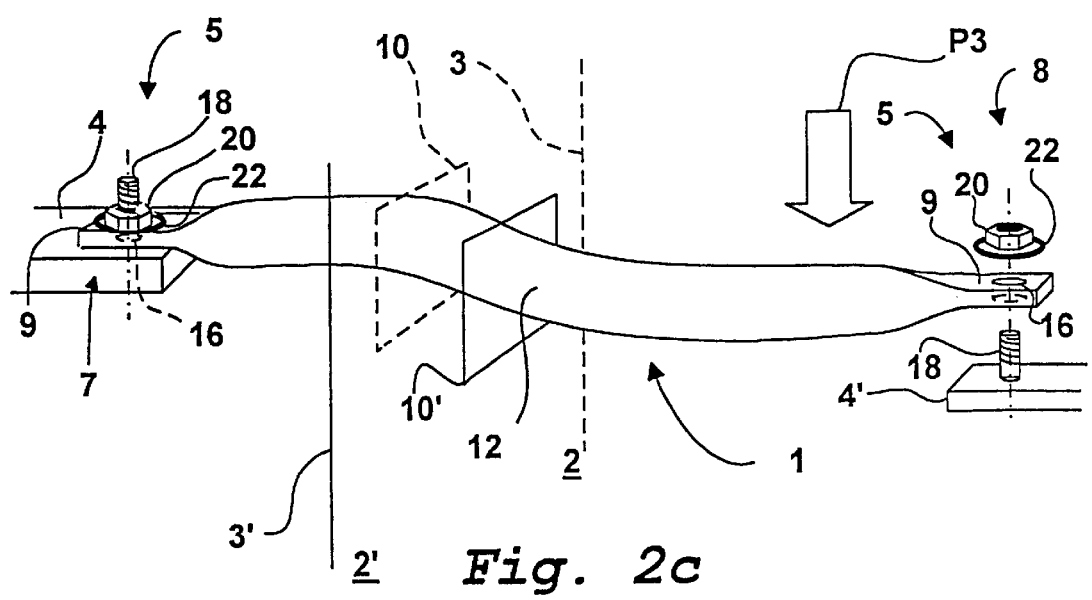
Figure 3:
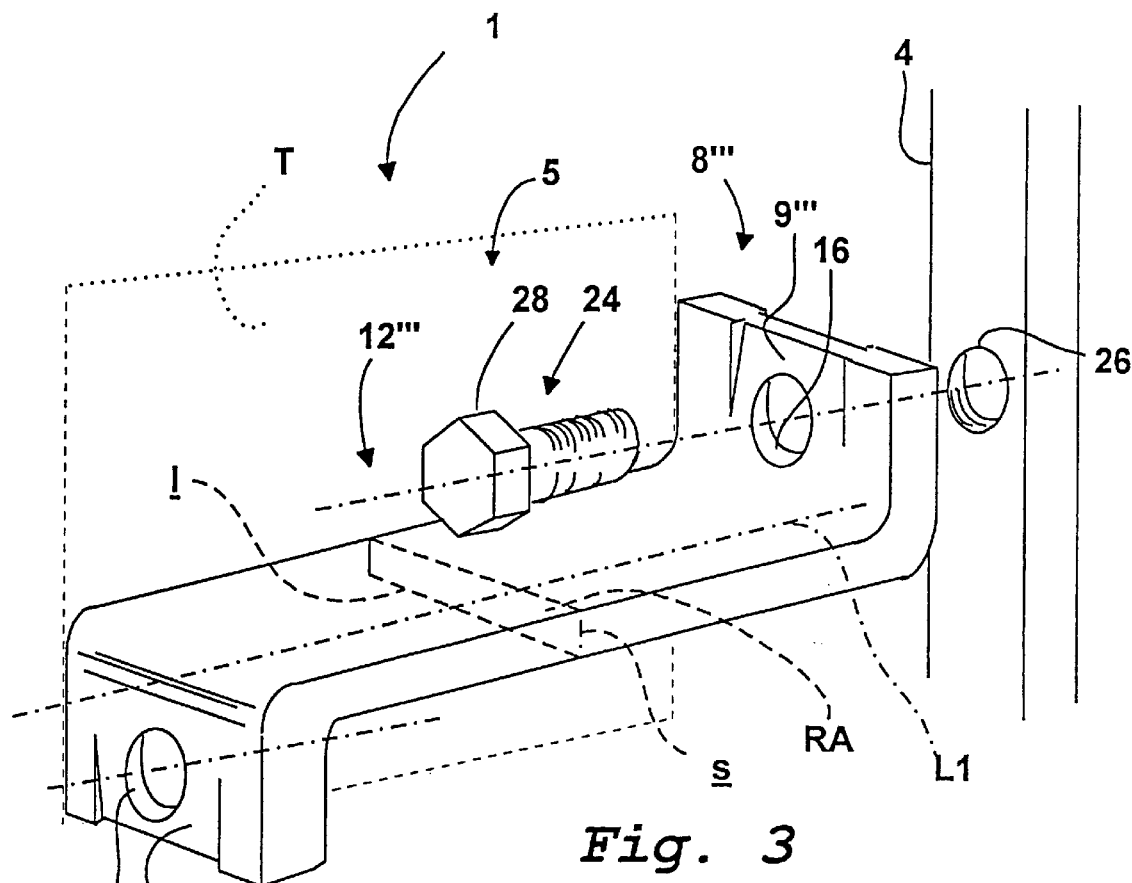
Figure 4A:
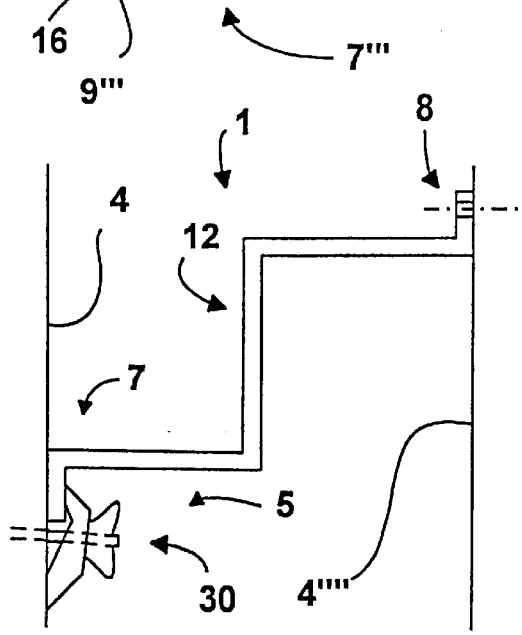
Figure 4B:
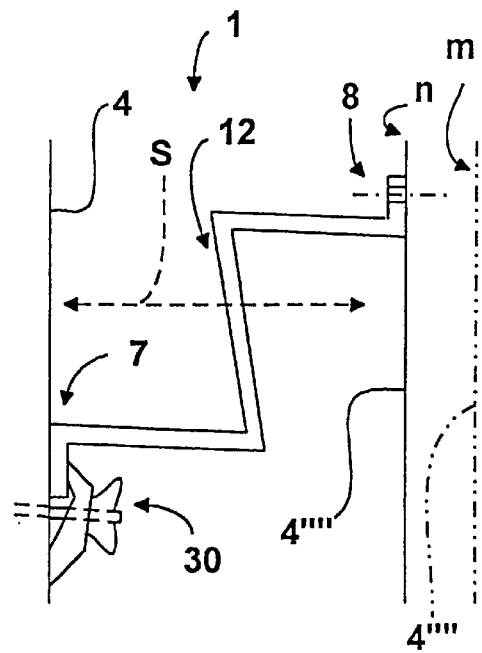

The invention will now be described more closely by examples with reference to the accompanying drawings, in which FIG. 1 schematically in perspective illustrates a plurality of cabinets mountable and connectable to each other for distribution of electrical power, FIGS. 2a–2c schematically in perspective illustrate a connection member according to a first embodiment, FIG. 2d schematically shows a joining end portion of a connection member according to a second embodiment, FIG. 3 schematically in perspective illustrates a connection member according to a third embodiment, and FIGS. 4a–4b schematically in a side view illustrate a connection member with its prolongation formed as a Z.

DETAILED DESCRIPTION OF THE INVENTION

The FIG. 1 shows schematically a connection member 1 according to the invention, which connection member 1 is made of copper for electrical connection between at least two electric power distribution modules 2, such as power plant equipment cabinets 2a, 2b, 2c, 2' and 2". Parts not relevant for the present invention have been omitted from the figures for the sake of clarity of illustration.

Referring to the FIG. 1, there is shown schematically a plurality of cabinets 2a, 2b and 2c. The cabinet 2' is going to be mounted to the cabinet 2b by assembly personnel (not shown). A rear side panel 3 of the cabinet 2' is oriented towards the opposite side of the adjacent cabinet 2b in a direction corresponding to the arrows d' in a so-called rear-to-rear position.

A connection member 1 according to the invention is fastened to a bus bar 4 within the cabinet 2b by means of a junction means (5, see FIG. 2a) which will be described more closely further on bellow. The bus bar 4 is connected to a current rectifier 6 (which could be any optional electric power apparatus) provided in the cabinet 2b. A bus bar 4' arranged in the cabinet 2' distributes the actual current to electric power distribution units (not shown) within the cabinet 2' and is furthermore connected to a current rectifier 6'.

Doors (not shown), arranged at the sides of each cabinet 2a, 2b, 2c, 2' and 2", are provided for making it easy for the assembly personnel to fasten a first joining end portion 7 of the connection member 1 to the bus bar 4. The cabinet 2' is moved into a position so that the rear side panel 3 will be close to the opposite side of the adjacent cabinet 2b. That is, in a position similar to that relative position of the cabinet 2b and to cabinet 2c. The assembly personnel will thereafter fasten a second joining end portion 8 of the connection member 1 to a bus bar 4'. Now it is advantageously to adjust the cabinets 2b and 2' into a desirable position adjacent each other, not depending on a spring back effect or stiffness of the connection member.

Openings 10 are formed in a portion of the rear side panel 3 corresponding to the area of the bus bar, to which the first joining end portion is joined.

The cabinet 2" is going to be mounted to the cabinet 2c in a so-called side by side position in a direction defined of the arrows d". This procedure is made by the assembly personnel in a similar manner as described above regarding the rear-to-rear position assembly.

The FIGS. 2a–2c show a connection member 1 according to a first embodiment of the invention. The connection member 1 is made of copper and is manufactured in one piece. An intermediate portion 12 is a flexible part of the connection member 1 situated between the first joining end portion 7 and second joining end portion 8. The intermediate portion 12 is sufficient stiff to keep the first joining end portion 7 and the second joining end portion 8 in a first relative status, wherein the joining end portions have their relative positions with reference to a reference line L1 shown in FIG. 2a.

The whole connection member 1 is during the manufacturing process in a first step soft-annealed for making the intermediate portion 12 flexible. A part 9 of the respective joining end portions 7 and 8 is thereafter cold worked.

These parts 9 have though a higher degree of hardness than the intermediate portion 12. That is, until such degree of hardness of the material that the yield point will imply a non-floating fastening. The hardness of the part 9 of the joining end portions 7 and 8 has the effect that the fastening will be solid.

The connection member 1 has a circular cross-section area CA for making the intermediate portion 12 flexible in all directions divergent from a central line, in FIG. 2a referred with the reference L1, essentially defined by the longitudinal direction of the intermediate portion 12 when the joining end portions 7 and 8 are in the first relative status.

The assembly personnel fasten the first joining end portion 7 to a bus bar 4 of a cabinet 2, whereby the connection member 1 passes through the opening 10 of the back side of the cabinet 2. The joining end portions 7 and 8 are provided with junction means 5 for fastening the connection member 1 to the bus bars 4 and 4' of the cabinets 2 and 2' (see FIG. 2c).

The junction means 5 is provided with an aperture 16 formed by the part 9 of the joining end portions 7 and 8. The aperture 16 has a diameter A just larger than the diameter of a threaded pin 18 arranged at the bus bar 4. The threaded pin 18 is fastened to the bus bar 4 via a threaded bore (not shown) in the bus bar 4. The hardness of the material of the part 9 of the joining end portions 7 and 8 is so high, that a nut 20 drawn onto the threaded pin 18 against the part 9 will not fleet thereupon and be sufficient tightened. A locking washer 22 is arranged in between the nut 20 and the part 9.

Referring to the FIGS. 2b and 2c, there is shown schematically a cabinet 2' to be connected to the cabinet 2. The cabinet 2' is provided with an opening 10' in a rear side panel 3' similar to that in the cabinet 2. The connection member 1 is bent in accordance with the a row P1, so that the second joining end portion 8 will pass the opening 10' when the assembly personnel are pushing the cabinet 2' in the direction according to the arrow P2.

The intermediate portion 12 is made so flexible that the relative positions of the first joining end portion 7 and the second joining end portion 8 can be adjusted to a second relative status by means of plastic deformation of the intermediate portion 12. The joining end portions 7 and 8 have their relative positions with reference to the reference line L1. The second relative status is shown in FIG. 2b. The bending is done by hand by the assembly personnel.

A bus bar 4', similar to that in the cabinet 2, is arranged in the cabinet 2'. It should be noted, that the bus bars 4 and 4' are fixed in the respective cabinets 2 and 2'. This is, however, for the sake of clarity of illustration, not shown in the figures.

The assembly personnel push thereafter the second joining end portion 8 onto the bus bar 4' in accordance with the arrow P3 and fasten the connection member 1 by means of a junction means 5 similar to that at the opposite end.

The cabinets 2 and 2' can now be adjusted relatively to each other in several directions, which is achieved by connection member 1 according to the invention.

In FIG. 2d is shown a second embodiment of the invention. A second joining end portion 8" is made of a different material than the intermediate portion 12". The joining end portion 8" is connectable to the intermediate portion 12". The attachment of the joining end portion 8" to the intermediate portion 12" is performed by means of for example resistance welding (not shown). The joining end portion 8" is made of brass and the intermediate portion 12" is made of alumiminum. The latter portion is softer than the first-mentioned.

This embodiment is also advantageously when a set of intermediate portions 12" of different length or thickness is used in a standard system. Assembly personnel can hereby replace the joining end portion 8" designed with a first characteristic, to a joining end portion with a different characteristic, without the need to dismount the entire connection member 1. That is, to cut clear the joining end portion 8" from the intermediate portion and replace it with another joining end portion.

Referring to the FIG. 3, there is shown schematically a connection member 1 according to a third embodiment. The FIG. 3 though shows an example of the invention, in which parts denoted with a reference sign correspond to parts of the first embodiment with the same reference sign.

The connection member 1 has a rectangular cross-section area RA for making a intermediate portion 12''' essentially flexible in the directions congruent to a plane T extending transverse the cross-section area RA and parallel to the shorter side s of the rectangle defined by the rectangular cross-section. The cross-section area RA is defined by the shorter side s and a longer side 1.

The connection member 1 is made of copper and manufactured in one piece. The intermediate portion 12''' is a flexible part of the connection member 1 situated between a first joining end portion 7''' and second joining end portion 8'''. The intermediate portion 12''' is sufficient stiff to keep the first joining end portion 7''' and the second joining end portion 8''' in a first relative status, wherein the joining end portions have their relative positions with reference to a reference line L1.

A part 9''' of the respective joining end portions 7''' and 8''' is cold worked, while the rest of the connection member 1 is soft-annealed. The junction means 5 is provided with means adapted for a bolt 24. The bolt 24 is, for fastening the connection member 1 to a bus bar 4, first pushed through an aperture 16 formed by the part 9''' and then drawn by means of a tool (not shown) into a threaded bore 26 of the bus bar 4. When mounted, a head 28 of the bolt 24 has a pressure on the part 9''', sufficiently hard for making a satisfactory contact between the bus bar 4 and the connection member 1.

The FIGS. 4a and 4b shows schematically an embodiment of the invention, whereby the connection member 1 has its prolongation formed as a Z and is made of copper.

Hereby a folding effect is provided. When both joining end portions 7 and 8 of the connection member 1 are pulled from or pushed towards each other, the Z-formed prolongation implies that the connection member 1 will act like an expansion joint.

The intermediate portion 12 is made flexible according to the invention and the joining end portions 7 and 8 are made hard for making a non-floating junction of the connection member 1 onto the bus bars 4 and 4"" by means of a clamp member 30 or bolts (not shown).

In FIG. 4b is shown the altered position of a cabinet with a bus bar 4"" (from position m to position n).

This means that the mounting of the connection member to the bus bars 4 and 4"" will be less complicated and less expensive. Since the assembly personnel do not have to spend time wasting work to adjust the cabinets 2 to each other in an exact conjunction, especially an adjustment in the longitudinal direction (defined with the reference sign S) of the connection member, the procedure to connect the two cabinets 2 to each other will tale less time than what, is normal according to known technique. The connection member according to the invention also saves space, since no arrangements or constructions are arranged to the member.

Operation

Of course, the connection member 1 according to the invention may have other crosssection areas than of circular and rectangular form. The side by side position of the cabinets can also involve usage of stiff connection members as well as connection members according to the present invention.

The procedure to assembly the cabinets may be performed in such way, that the cabinets are placed together in a desirable position to each other in a first step. Thereafter the connection member, according to the present invention, is mounted to the bus bars of respective cabinet.

The distance between the bus bars of respective cabinet may be different in each specific case. The connection member 1 is despite this fact mountable to the bus bars, by means of the flexible intermediate portion.

The first embodiment is the primary embodiment of this invention.

The word comprising can in this application, if needed, be replaced by the word including. Of course may the invention be used in different fields of applications, but the primary field of application relates to power supply systems.

What is claimed is:

1. A connection member formed of metal for electrical connection between at least two electric power distribution modules, comprising:
   a first joining end portion and a second joining end portion being positionable in a first relative position in accordance with an intermediate portion positioned between said joining end portions, the intermediate portion being sufficiently rigid to maintain said portions in the first relative position, wherein said intermediate portion is sufficiently flexible so that said first and second joining end portions are adjustable to a second relative position by deforming said intermediate portion.

2. The connection member according to claim 1 wherein at least one of said joining end portions and said intermediate portion are formed of substantially the same material and in one piece.

3. The connection member according to claim 1 wherein at least one of said joining end portions is made of a material different than said intermediate portion.

4. The connection member according to claim 1 wherein said first and second joining end portions are manually adjustable to the second relative position.

5. The connection member according to claim 1 wherein said intermediate portion comprises soft-annealed material.

6. The connection member according to claim 1 wherein at least one of said joining end portions comprises cold worked material.

7. The connection member according to claim 1 wherein at least one of said joining end portions further comprises a junction, the junction fastening said connection member to a bus bar of said electric power distribution module.

8. The connection member according to claim 1 wherein said connection member includes a circular cross-sectional area rendering said intermediate portion flexible in all directions divergent from a central line defined by a longitudinal direction of said intermediate portion when said joining end portions are in said first relative.

9. The connection member according to claim 1 wherein said connection member includes a rectangular cross-sectional area for making said intermediate portion essentially flexible in directions congruent to a plane extending transversely the cross-sectional area and parallel to the shorter side of the rectangle defined by the rectangular cross-sectional area.

10. The connection member according to claim 1 wherein said connection member is formed of copper.

* * * * *